United States Patent [19]

Becking

[11] Patent Number: 4,982,636
[45] Date of Patent: Jan. 8, 1991

[54] MEASURED LEADER LENGTH SUPPLY SYSTEM

[76] Inventor: Paul E. Becking, P.O. Box 3200, Monterey, Calif. 93940

[21] Appl. No.: 324,941

[22] Filed: Mar. 17, 1989

[51] Int. Cl.$^5$ ............................................. B26D 7/02
[52] U.S. Cl. ....................................... 83/167; 83/277; 83/280; 83/359; 83/436; 83/948
[58] Field of Search .............. 242/56 R, 58.1; 83/209, 83/277, 278, 279, 280, 359, 167, 360, 367, 404, 436, 948, 358; 53/589, 593

[56] References Cited

U.S. PATENT DOCUMENTS

| | | | |
|---|---|---|---|
| 2,931,482 | 4/1960 | Bishop | 197/175 |
| 4,022,087 | 5/1977 | Queen et al. | 83/436 X |
| 4,120,239 | 10/1978 | Pasic et al. | 100/26 |
| 4,415,285 | 11/1983 | Bury | 400/196.1 |
| 4,591,084 | 5/1986 | Balian et al. | 242/58.1 |
| 4,609,422 | 9/1986 | Becking | 156/502 |
| 4,624,198 | 11/1986 | Beame et al. | 112/10 |
| 4,632,327 | 12/1986 | Kreeft et al. | 242/56 R |
| 4,827,997 | 5/1989 | Jacobsen et al. | 100/32 |

Primary Examiner—Hien H. Phan
Assistant Examiner—Ken Peterson
Attorney, Agent, or Firm—Gregory L. Maag; David A. Rose; Ned L. Conley

[57] ABSTRACT

There is provided an apparatus for supplying precisely measured lengths of leader ribbon for use in the assembly of printer ribbon cartridges. The apparatus includes a supply of leader ribbon, an accumulator for retaining a length of the ribbon when it is drawn from the ribbon supply and a drive assembly for drawing a measured length into the accumulator. The drive assembly includes a fixed roller and a pivotable roller positioned on opposite sides of the ribbon path for engaging the ribbon therebetween. A stepping motor is provided for rotating the rollers a prescribed number of revolutions and thereby stuffing a measured length of the engaged ribbon into the accumulator. The apparatus also includes a cutter for severing the measured leader length from the supply ribbon.

24 Claims, 6 Drawing Sheets

MEASURED LEADER LENGTH SUPPLY SYSTEM

BACKGROUND OF THE INVENTION

The present invention relates generally to cartridges containing a continuous loop of ribbon, especially fabric ribbon, for use in printers associated with equipment such as computers and word processors. More particularly, the present invention relates to apparatus employed in loading assembled cartridges with inked printer ribbon. Still more particularly, the present invention relates to an apparatus for supplying measured lengths of leader ribbon used in the assembly and loading of printer ribbon cartridges.

Present society is highly dependent on the use of microprocessors, minicomputers, and mainframe computers. In addition to the more traditional use of computers as a research tool, computers are now often found in the home environment and work environment of individuals who, until recently, never before came into contact with a computer. Computers are used to automate equipment in a manufacturing facility, to automate secretarial duties at the office and to automate a myriad of toys and tools around the home.

All computers, whether mainframe computers, minicomputers or microcomputers, share a common requirement for some means of communication with users. Such means of communication may vary from a simple light-emitting diode (LED) to the complex cathode ray tube (CRT) terminal. A common means for communication of information from a computer to a user is a printer. Printers typically receive from a computer a stream of information in the form of digital electronic signals and convert the electronic signals to a series of symbols (letters, numbers and words) printed on paper.

A first common type of printer is an impact printer, so named for the means by which characters are printed on paper. Each symbol which the impact printer is capable of generating is permanently embossed on a striking surface (analogous to the ball within a typewriter) within the printer. The printing of a particular character is accomplished by aligning the embossed image of that character with the paper surface onto which the characters are to be printed, positioning a printer ribbon having ink thereon between the striker and the paper, and causing the striker to impact the ribbon against the paper surface so as to result in an ink image of the embossed character on the surface of the paper. Printer ribbons typically are made of fabric, such as nylon, or polyester film coated with a carbon-type surface.

A second common type of printer is a dot matrix printer. Such a printer includes a group of small-diameter wires oriented parallel to one another and arranged in a two-dimensional matrix. Each wire is arranged for independent extension from its normal matrix position to contact a printer ribbon, thereby printing a dot image on an adjacent paper surface. By selectively extending particular patterns of wires, dot images can be combined to form alphanumeric or other legible characters on the paper surface.

In approximately 1970 there first appeared on the market a printer ribbon having the ends thereof adjoined to form a continuous loop. The continuous loop ribbons are housed within cartridges which easily may be removed from and inserted within the printers. Such continuous loop cartridges mechanically simplify the ribbon control portion of printers and thereby eliminate a potential source of printer failure.

A number of companies throughout the world today are engaged in the business of manufacturing and/or loading printer ribbon cartridges. Printer ribbon cartridges are typically assembled manually, and are assembled before they are loaded with printer ribbon which is generally delivered to the cartridge manufacturer uninked or inked and spooled into large, narrow rolls.

In order to subsequently load the assembled cartridge with printer ribbon, the cartridge may be assembled with a length of leader ribbon threaded through the cartridge's housing. The ends of the leader ribbon are left extending outside the assembled cartridge. These exposed ends of the leader ribbon may then be attached to inked printer ribbon and the leader ribbon used by the cartridge drive members or an external drive member to draw the appropriate length of printer ribbon into the previously assembled cartridge. One such apparatus particularly useful in automatically stuffing the assembled cartridge with inked printer ribbon is disclosed in U.S. Pat. No. 4,609,422, issued Sept. 2, 1986.

To date, it has been the conventional practice to manually measure and sever the required lengths of leader ribbon from a supply reel or spool of such ribbon. Because this process of supplying measured leader lengths is performed manually, it is subject to operator errors both in the step of measuring the appropriate leader length, and in the step of cutting the ribbon at the appropriate location. The likelihood of errors is increased due to the time pressures that competitive forces place on the cartridge manufacturer's labor force.

In manufacturing printer ribbon cartridges, it is critical that the cartridges be assembled with the proper length of leader ribbon. If the cartridge is assembled with a leader that is too short, the stuffer apparatus will not be able to load the cartridge with inked ribbon, requiring the operator to remove the defective cartridge, replace it with another and again ready the stuffing apparatus for the loading of a cartridge. As is evident, a cartridge having a leader that is too short causes costly delays in the stuffing of the assembled cartridges and in the ultimate production of printer ribbon cartridges. In addition, the defective cartridge must either be discarded, resulting in material waste, or reassembled, resulting in additional labor costs.

Similarly, if a cartridge is assembled with a leader ribbon which is longer than that required by the stuffing apparatus, an operator is required to manually jog the drive motor in the stuffer apparatus in order to take up the excess leader length prior to initiating the stuffing cycle. Once again, the extra operator interaction delays the stuffing process and the ultimate production of finished cartridges. All such delays and output reductions directly affect the manufacturer's profitability.

As is readily apparent, certain inadequacies exist in the present method and apparatus that are employed to supply the lengths of leader ribbon for use in assembling and loading printer ribbon cartridges. An apparatus which would accurately measure and sever the appropriate leader length from a ribbon supply and do so automatically with a minimum of operator involvement would be a welcomed addition to this art. Further, an apparatus which could store the severed leader length in a convenient position for use by the operator in assembling the cartridge would be an additional benefit. Ideally, the apparatus should be able to accommodate all types and widths of printer ribbons and would be easily adjusted so as to supply the varying lengths of leader ribbon needed for the different cartridge configurations.

SUMMARY OF THE INVENTION

Accordingly, there is provided herein apparatus for supplying a precisely measured length of leader ribbon for use in the manual or automated assembly of a printer ribbon cartridge and the subsequent automatic loading of printer ribbon into the cartridge. The apparatus of the present invention comprises a supply of leader ribbon, an accumulator for collecting a length of the leader ribbon as it is drawn from the ribbon supply, a mechanism for drawing a measured length of the leader ribbon into the accumulator, and a cutter for severing the measured length from the ribbon supply.

The accumulator is generally a box-like enclosure having a ribbon path formed therethrough. The drawing mechanism includes a gripper for grasping the leading end of the supply ribbon and drawing the ribbon through the accumulator along the ribbon path. The drawing mechanism further includes a drive assembly for engaging the ribbon along the ribbon path and stuffing a measured length into the accumulator.

The drive assembly includes a drive roller fixed in position on one side of the ribbon path and a pivotable pinch roller positioned on the opposite side of the ribbon path. The drive assembly further includes a pivoting means for pivoting the pinch roller toward and away from the ribbon path. The pivoting means pivots the pinch roller away from the ribbon path when the ribbon is drawn through the accumulator by the gripper, and, thereafter, pivots the pinch roller toward the ribbon path so as to engage the ribbon between the pinch and drive rollers. The drive assembly also includes a stepping motor coupled to the drive roller for rotating the drive and pinch rollers a precise and predetermined number of revolutions so as to stuff a measured length of the engaged leader ribbon into the accumulator.

The cutter may include a pair of opposing blades positioned opposite one another on either side of the ribbon path. The cutting blades, which may be pneumatically actuated, cooperate to sever the measured leader length from the supply ribbon by the scissor action of the blades. The cutter may alternatively comprise a rotating cutting blade for severing the ribbon with or without an opposing blade.

The present invention may further include a control system for controlling the operation of the drawing mechanism and cutter and may also include a detector in the accumulator for detecting when the accumulator is empty and signaling the controller to actuate the drawing mechanism and cutter.

The invention may also include a clamping device for clamping the leader ribbon once the measured length has been drawn into the accumulator. The clamping device may include a pair of pneumatically actuated clamping fingers. Further, the cutter components may be attached to the clamping fingers such that the ribbon is clamped and the measured leader length severed in a single operation.

The present invention provides an automated apparatus for supplying an operator with a precisely measured length of leader ribbon for use in assembling printer ribbon cartridges. The apparatus can supply a desired length of any of a number of types and sizes of printer ribbons. The accurately measured and severed leader length supplied by the invention eliminates the time consuming and costly operator intervention in the automated process by which the assembled cartridge is stuffed with inked printer ribbon. Further, the invention eliminates the necessity of discarding, or dismantling and reassembling, cartridges which were assembled with leader ribbons that were too short.

These and various other objects and advantages of the present invention will become readily apparent to those skilled in the art upon reading the following detailed description and claims and by referring to the accompanying drawings.

BRIEF DESCRIPTION OF THE DRAWINGS

For detailed description of the preferred embodiment of the invention, reference will now be made to the accompanying drawings wherein.

DESCRIPTION OF THE PREFERRED EMBODIMENT

Figure 1:
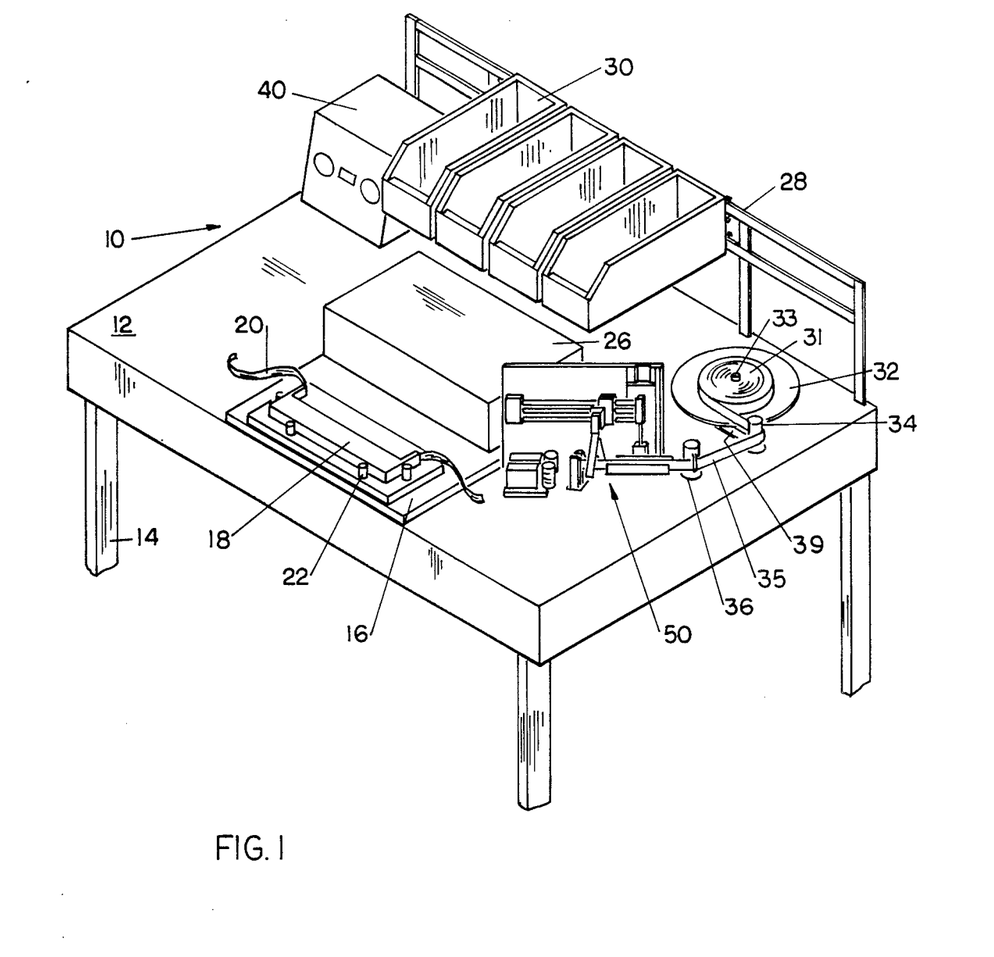
FIG. 1 shows a perspective view of the measured leader length supply system structured according to the principles of the present invention, the system being depicted as a part of a cartridge assembly work station.

Referring to FIG. 1, there is depicted a ribbon cartridge assembly station 10 which includes the present invention, a measured leader length supply system 50. Cartridge assembly station 10 is a work station supplying a working surface and all the components for assembling any of a number of various printer ribbon cartridges. Assembly station 10 generally comprises a base plate 12 supported upon frame 14, base plate 12 in turn supporting the measured leader length supply system 50, a cartridge assembly plate 16, a part bin support structure 28, and a ribbon turn table 32. Base plate 12 may further support a pneumatic press 26 for closing the ribbon cartridges once assembled. Base plate 12 is preferably manufactured from steel or aluminum, but may be made from any rigid material capable of supporting the various components described herein. Cartridge assembly plate 16 is generally centrally positioned upon base plate 12 and forms the working surface used by a technician to manually assemble ribbon cartridge components into a completed cartridge 18. An assembled ribbon cartridge 18 including leader ribbon length 20 is depicted in FIG. 1, cartridge 18 being retained upon cartridge assembly plate 16 by moveable cartridge positioners 22. Part bin support structure 28 is also fixed to base plate 12. A plurality of part bins 30 are fastened to support structure 28 and contain the various components used by the operator in assembling the ribbon cartridges 18.

Ribbon turn table 32 is rotatably supported upon and attached to base plate 12 and includes a spindle 33 for retaining ribbon reel 31 which is wound with un-inked leader ribbon 35. A ribbon guide 36 is also fixed to base plate 12. A ribbon tensioning post 34 is supported by a spring loaded pivotable arm 39 which is attached to base plate 12 arm 39 and tensions ribbon 35 as it is withdrawn from reel 31. Pivotable further includes a brake shoe assembly (not shown) biased so as to normally bear against the edge of turn table 32. When ribbon 35 is withdrawn from reel 31, the brake shoe pivots away and out of contact with turn table 32. When the force drawing ribbon 35 from reel 31 is disconnected, the brake assembly engages turn table 32 and stops its rotation, thereby preventing overrun of reel 31. The leading end of leader ribbon 35 is manually threaded around ribbon tensioning post 34 and ribbon guide 36 and into measured leader length supply system 50. As described in more detail below, measured leader length supply system 50, when actuated, automatically measures and severs the appropriate leader ribbon length 20 from leader ribbon 35 and stores leader length 20 until it is needed for the assembly of a completed ribbon cartridge 18.

Still referring to FIG. 1, also fixed upon base plate 12 is control panel 40 which houses various switches and controls described below for operating measured leader length supply system 50 and for assembling ribbon cartridges 18.

Figure 2:
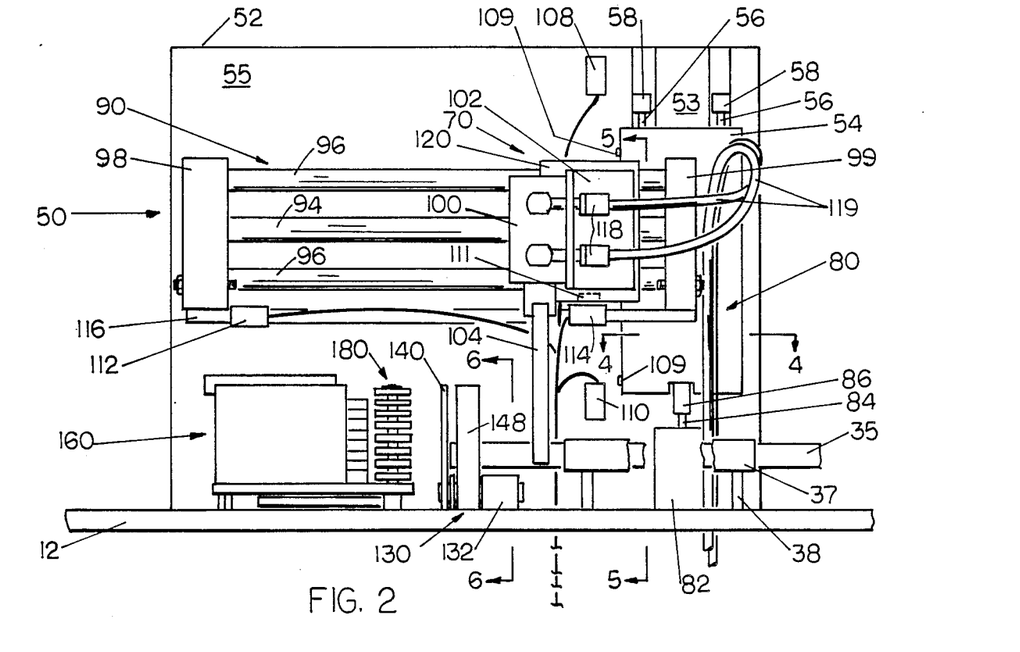
FIG. 2 depicts a front elevation view of the measured leader length supply system shown in FIG. 1.
Figure 12:
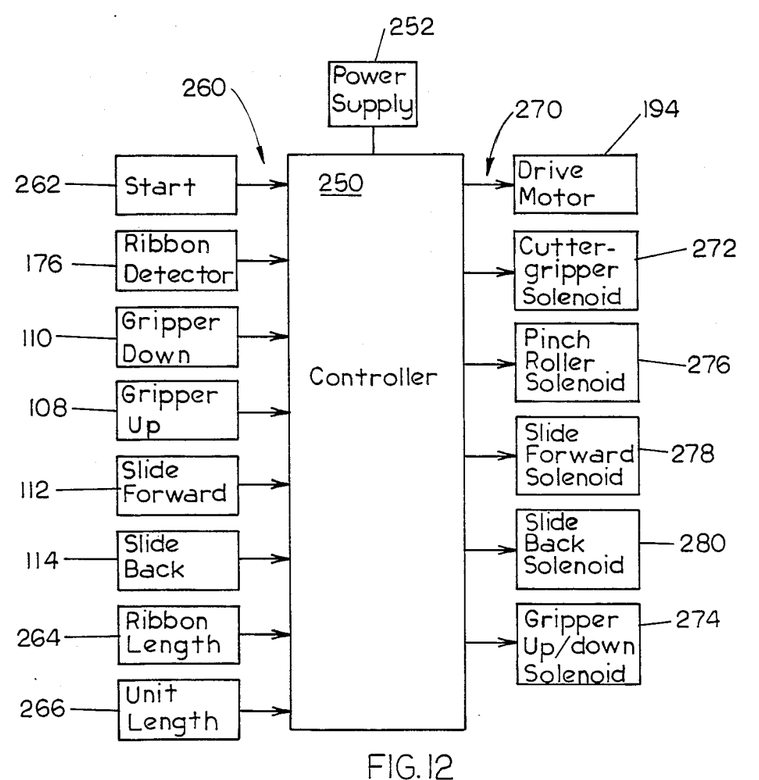
FIG. 12 shows a block diagram of a control system for the measured leader length supply system shown in FIG. 1.

Referring now to FIG. 2, there is depicted an elevation view of the measured leader length supply system 50 which generally comprises a gripper assembly 70, a cutter and clamp assembly 130, an accumulator assembly 160, a drive assembly 180 and a controller 250, shown in FIG. 12. As described in more detail below, gripper assembly 70 grasps the leading end of leader ribbon 35 and draws the ribbon through both the cutter and clamp assembly 130 and accumulator assembly 160. Controller 250 (FIG. 12), then actuates drive assembly 180, which includes a stepping motor 194 (FIG. 10), and the appropriate length of leader ribbon is drawn into the accumulator assembly 160 from ribbon reel 31 shown in FIG. 1. Cutter and clamp assembly 130 then severs the measured leader ribbon length 20 from leader ribbon 35 and clamps the newly formed leading end of leader ribbon 35. Gripper assembly 70 then releases leader length 20 and returns to its initial position. Leader ribbon length 20 is retained within accumulator assembly 160 until it is needed for use in assembling a cartridge 18, at which time it is manually withdrawn from the accumulator by an operator. A ribbon detector 176 (FIG. 12) within accumulator assembly 160 then senses that the accumulator is empty and signals controller 250 which initiates the supply sequence again.

Gripper Assembly 70

Figure 3:
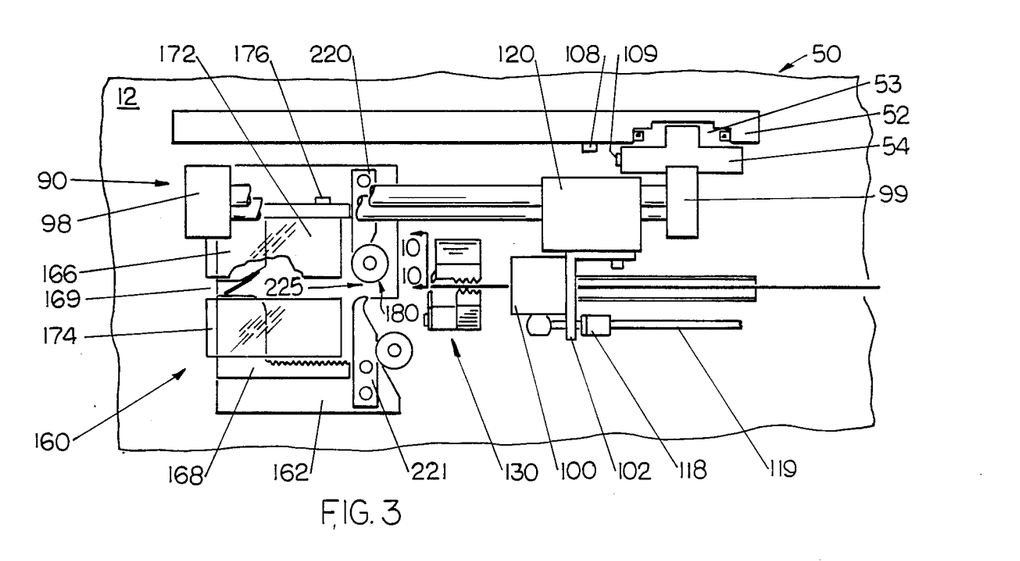
FIG. 3 shows a top plan view of the measured leader length supply system depicted in FIG. 2.
Figure 5:
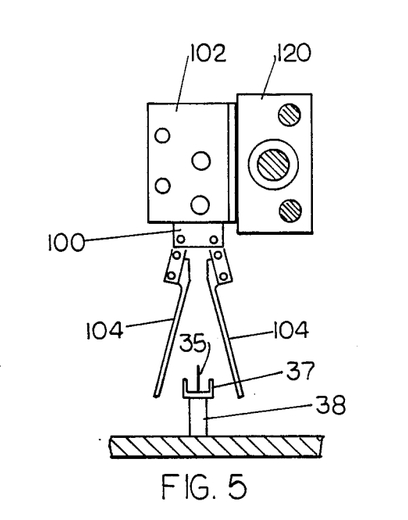
FIG. 5 shows an elevation view of the gripper assembly.

Referring now to FIGS. 2, 3 and 5, gripper assembly 70 generally includes gripper 100, horizontal drive 90, vertical drive 80 and support plate 52. Support plate 52 is preferably made of aluminum and is fixed perpendicularly to the upper surface of base plate 12 of cartridge assembly station 10. As explained in detail below, support plate 52 serves to support horizontal and vertical drives 90, 80 which, in response to control signals from controller 250, transport gripper 100 along the facing surface 55 of support plate 52. More specifically, vertical drive 80 transports gripper 100 up and down along support plate 52 while horizontal drive 90 moves gripper 100 forward and back, or left and right respectively, as viewed in FIG. 2.

Figures 4, 6:
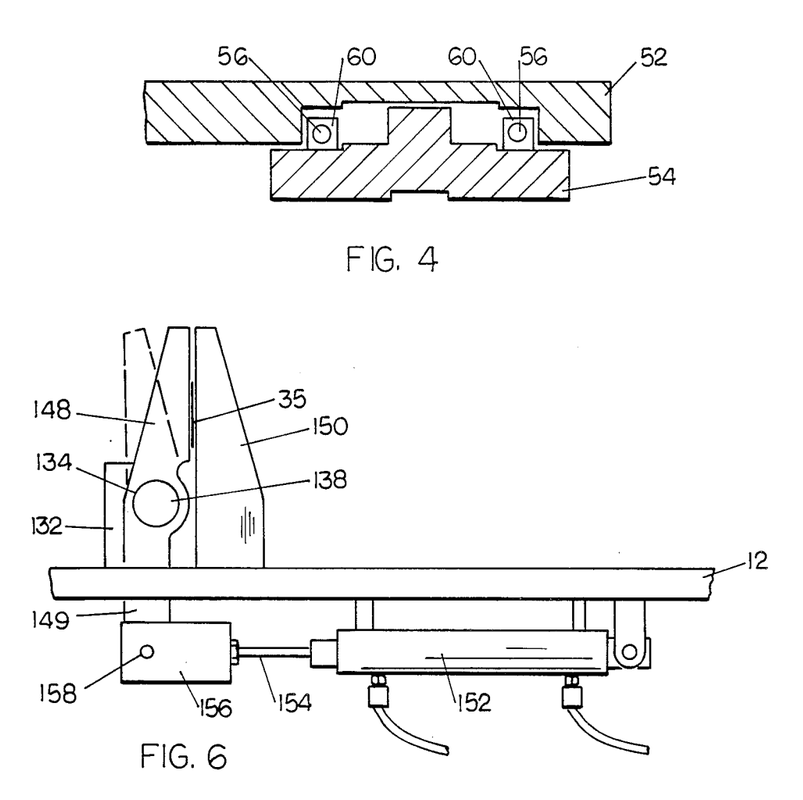
FIG. 4 depicts a partial cross sectional view of the gripper assembly support plate and slide plate taken along line 4—4 in FIG. 2.
FIG. 6 shows an elevation view of a cutter and clamp assembly.

As best shown in FIGS. 2 and 3, vertical drive 80 includes a rectangular slide plate 54, preferably made of aluminum, which is slidably engaged upon support plate 52. Vertical drive 80 also includes a pneumatic cylinder 82 used to raise and lower slide plate 54. Support plate 52 includes a vertical channel 53 formed in facing surface 55. A pair of guide rods 56 are fixed in parallel configuration along the sides of channel 53 by rod supports 58. As shown in FIG. 4, fixed to the back of slide plate 54 are aligned bearings 60 which slidably engage guide rods 56 and enable slide plate 54 to reciprocate vertically along guide rods 56.

Referring again to FIG. 2, the vertical movement of slide plate 54 is accomplished by actuation of pneumatic cylinder 82. Cylinder 82 is a double action pneumatic cylinder. A cylinder manufactured by Bimba Manufacturing Co., Model No. BF-01-1.5-0 proved satisfactory for this application. Cylinder 82 is mounted vertically on support plate 52 below channel 53. Piston shaft 84 extends from cylinder 82 and is threaded into a shaft extension 86 which, in turn, is fixed to the lower end of slide plate 54. In this configuration, pneumatic actuation of cylinder 82 will cause slide plate 54 to travel upward along facing surface 55 of support plate 52. Piston shaft 84 will retract when the pneumatic supply to cylinder 82 is reversed causing slide plate 54 to move to its lower most position as shown in FIG. 2. A pair of magnets 109 are embedded in the side of slide plate 54 and, as described below, are used to signal the position of slide plate 54 and gripper 100 to controller 250. Magnets 109 may be, for example, Model No. 101 MG7 8809 as manufactured by the Microswitch Division of Honeywell, Inc.

Referring still to FIG. 2, rigidly attached to slide plate 54 is horizontal drive 90 which in the preferred embodiment is a drive unit manufactured by SMC Pneumatics, Inc., part number NCDY1S1OH-0750. Horizontal drive 90 includes a double acting pneumatic cylinder 94, a pair of guide rods 96, end pieces 98, 99 and travelling member 120 (FIG. 3). Cylinder 94 includes an internal magnetic piston (not shown). Cylinder 94 and guide rods 96 are fixed in parallel relationship to left and right end pieces 98, 99 respectively. Right end piece 99 is rigidly attached to slide plate 54 such that cylinder 94 and guide rods 96 extend substantially at right angles from the vertical line of travel of slide plate 54. Slidably engaging guide rods 96 and cylinder 94 is traveling member 120. Traveling member 120 includes a pair of horizontal bores with sleeved bearings through which guide rods 96 are disposed. Traveling member 120 further includes a central bore 122 having a magnetic bushing (not shown) for slidingly engaging pneumatic cylinder 94. Due to the magnetic coupling between the magnetic piston of cylinder 94 and the magnetic bushing in travelling member 120, traveling member 120 will travel along cylinder 94 and guide rods 96 in response to the reciprocal movement of the magnetic piston within pneumatic cylinder 94.

Gripper 100, which in the preferred embodiment is a Mini Hand IMH 20-C by Tomita U.S.A., Inc., is attached to travelling member 120 by L-shaped mounting bracket 102, best shown in FIGS. 2 and 3. As depicted, one leg of mounting bracket 102 is fixed to travelling member 120 while the second leg is fixed to gripper 100. Gripper 100 includes a pair of downwardly extending, pneumatically actuated jaws 104 which are used to grip leader ribbon 35 and draw it into the accumulator assembly 160. Gripper 100 further includes a pair of pneumatic tube connectors 118 for connecting pneumatic lines 119 to gripper 100 which, in the preferred embodiment, extend through bores formed in gripper mounting bracket 102. Gripper 100 is attached to travelling member 120 which includes a magnet 111 embedded in the lower face of travelling member 120 as shown in FIG. 2. As explained below, magnet 111 is employed to signal the horizontal position of gripper 100 to controller 250.

By operation of the drive apparatus thus described, gripper 100 may be moved forward and backward along support plate 52 by actuation of horizontal drive 90, and may be raised and lowered by vertical drive 80. To limit the travel of gripper 100 in both the horizontal and vertical directions, the measured leader length supply system 50 includes four Hall effect sensors 108, 110, 112, 114 positioned about support plate 52 and electrically connected to controller 250. As best shown in FIG. 2, Hall effect sensors 108 and 110 are attached to facing surface 55 of support plate 52 in a line parallel and adjacent to the line of travel of magnets 109 in slide plate 54. In the preferred embodiment, sensors 108, 110, 112, 114 are Model No. D-F76 as manufactured by SMC Pneumatics, Inc. Sensors 108, 110 detect the proximity of magnets 109 and signal controller 250 that gripper 100 has reached its uppermost or lower most position respectively. Hall effect sensors 112, 114 similarly signal the horizontal position of gripper 100 to controller 250. A sensor mounting channel 116 is attached to the bottom of end pieces 98, 99 of horizontal drive 90 parallel to pneumatic cylinder 94. Sensors 112 and 114 are mounted near the left and right ends of mounting channel 116 as viewed in FIG. 2 and, by detecting the proximity of magnet 111, signal controller 250 when gripper 100 has reached the forward and back position respectively.

Cutter and Clamp Assembly 130

Figure 7A:
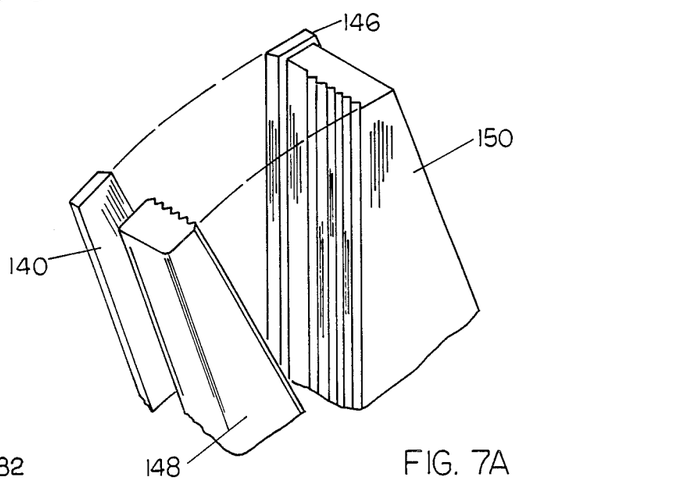
FIG. 7A shows a perspective view of a portion of the cutter and clamp assembly depicted in FIG. 6.

The cutter and clamp assembly 130 is best shown in FIGS. 2, 6 and 7A and generally includes an elongate base 132 supporting a pair of clamping fingers 148, 150 and a pair of cutting blades 140, 146. Upon actuation by controller 250, cutter and clamp assembly 130 clamps leader ribbon 35 between fingers 148 and 150 and then severs a measured length 20 of ribbon 35 by means of blades 140, 146. A ribbon track 37 having a generally U-shaped cross section is mounted on base plate 12 by stand-offs 38 and supports leader ribbon 35 as it is drawn from ribbon reel 31 around tensioning post 34 and ribbon guide 36 and into cutter and clamp assembly 130.

Referring to FIG. 6, base 132 is fastened to base plate 12 and includes a longitudinal bore 134 formed parallel to the path of ribbon 35. Disposed within bore 134 is a pivotable shaft 138. Rigidly attached to one end of shaft 138 are pivotable clamping finger 148 and pivotable cutting blade 140. Attached to base 132 opposite pivotable clamping finger 148 is an upwardly extending fixed clamping finger 150. Fixed cutting blade 146 is attached to fixed clamping finger 150 opposite pivotable cutting blade 140.

Referring still to FIG. 6, pivotable clamping finger 148 includes a lower extension 149 which extends through an aperture in base plate 12. A double acting pneumatic cylinder 152 is attached beneath base plate 12 and includes a piston rod 154 which is threaded to a clevis 156, clevis 156 being rotatably fixed to lower extension 149 of pivotable clamping finger 148 by pin 158. The reciprocal action of piston rod 154 within pneumatic cylinder 152 causes shaft 138 to pivot within base 132, thereby also pivoting clamping finger 148 and blade 140. As can be seen in FIG. 6, as shaft 138 rotates in the clockwise direction, pivotable clamping finger 148 will engage fixed clamping finger 150 thereby securing leader ribbon 35 therebetween. As best shown in FIG. 7A, after leader ribbon 35 is clamped, leader ribbon 35 is cut by the scissor action of pivotable blade 140 against fixed blade 146.

Figure 7B:
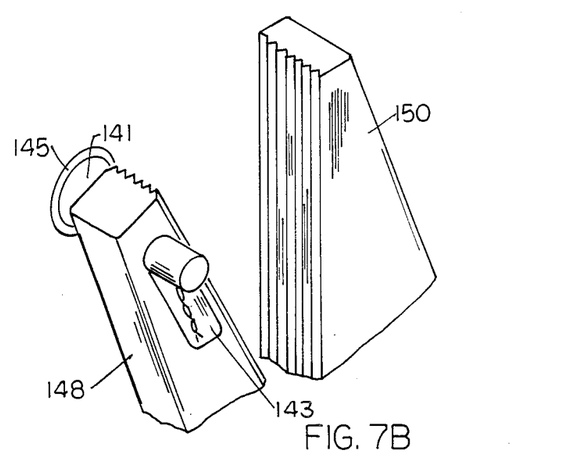
FIG. 7B shows a perspective view of a portion of an alternative cutter.

An alternative embodiment of the cutter mechanism is shown in FIG. 7B. As shown, a rotatable cutting blade 141 is rotatably secured to pivoting clamping finger 148 and is driven by motor 143 by a shaft (not shown) extending through clamping finger 148. Rotatable cutting blade 141 includes a toothless blade having a tapered edge 145. Blade 141 is positioned along guide track 143 that is formed on clamping finger 148 parallel to the clamp face. A pneumatic cylinder or other operating mechanism known to those skilled in the art (not shown) is connected to the cutter mechanism to permit the mechanism to traverse guide track 143 such that the ribbon 35 will be severed by blade 141 after it has been clamped between fingers 148, 150.

Accumulator Assembly 160

Figure 8:
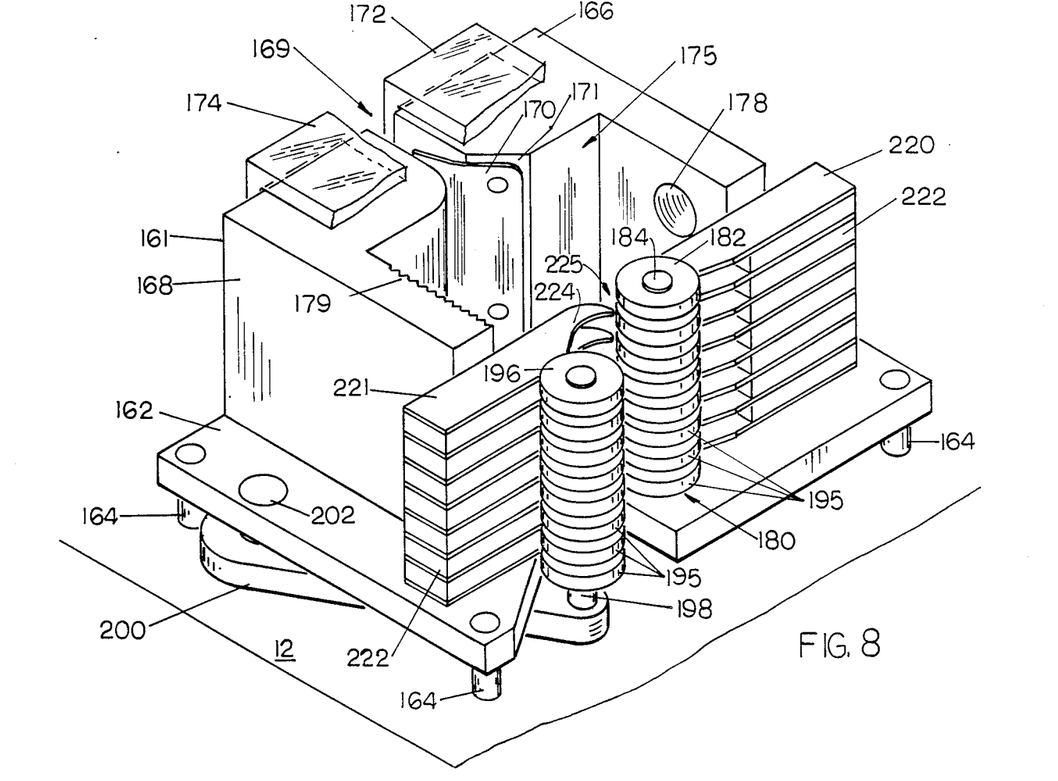
FIG. 8 shows a perspective view of the accumulator and a portion of the drive apparatus shown in FIG. 3.

Referring to FIGS. 3 and 8, accumulator assembly 160 includes a generally box-like enclosure 161 in which a measured length of leader ribbon 35 is stuffed by drive assembly 180 and stored until needed for the assembly of a ribbon cartridge 18.

Accumulator enclosure 161 includes base 162 supported above base plate 12 by stand offs 164. Supported upon and fixed to accumulator base 162 are left and right side members 166, 168 and a pair of strippers 220, 221. A pair of spaced-apart plastic accumulator covers 172, 174 rest upon side members 166, 168. Together these components form an interior chamber 175 generally formed by the inner surfaces of accumulator base 162, covers 172, 174, side members 166, 168 and strippers 220, 221.

Left and right side members 166, 168 are positioned upon and attached to accumulator base 162 opposite and substantially parallel to one another such that a gap 169 is formed there between. Strippers 220, 221 are attached to accumulator base 162 generally perpendicularly to the ends of left and right side members 166, 168 such that a gap 225, formed between the ends of strippers 220, 221, is aligned with gap 169. The separation between accumulator covers 172, 174 is directly above and aligned with gaps 169, 225 so as to form a path for gripper jaws 104 to transport leader ribbon 35 through accumulator enclosure 161 as gripper 100 is driven from right to left as viewed in FIG. 3 by horizontal drive 90.

Referring still to FIGS. 3 and 8, left side member 166 includes a beveled face 171. Rigidly attached to beveled face 171 is tension clip 170. Tension clip 170 is made of a thin flexible metal and extends diagonally across gap 169. As gripper 100 transports leader ribbon 35 through accumulator enclosure 161, gripper jaws 104 engage tension clip 170 causing tension clip 170 to flex toward left side member 166, allowing gripper jaws 104 and ribbon 35 to pass through gap 169. After gripper 100 has passed tension clip 170, tension clip 170 springs back to its unflexed position extending diagonally into gap 169. After a length of leader ribbon 35 has been drawn into accumulator enclosure 161 and a leader length 20 has been severed by cutter and clamp assembly 130, tension clip 170 tensions leader length 20 as it is pulled from enclosure 161 by the cartridge assembly technician.

The accumulator assembly 160 also includes a ribbon detector 176 for detecting the presence or absence of ribbon within accumulator enclosure 161. In the preferred embodiment, the ribbon detector 176 comprises an optical sensor. One such sensor that has been found satisfactory is Model No. EX-D200E manufactured by Sunx Corp. As shown in FIG. 8, ribbon detector 176 is mounted in bore 178 in left side member 166 facing the inner surface of right side member 168. Grooves 179 are formed on the inner surface of right side member 168. Grooves 179 are coated with optical black serving to prevent operation of the optical sensor indiscriminately. Without blackened grooves 179, the light may tend to "bounce back" to the sensor and indicate falsely that a length of leader ribbon 35 is in accumulator 160.

Accumulator Drive Assembly 180

Figure 9:
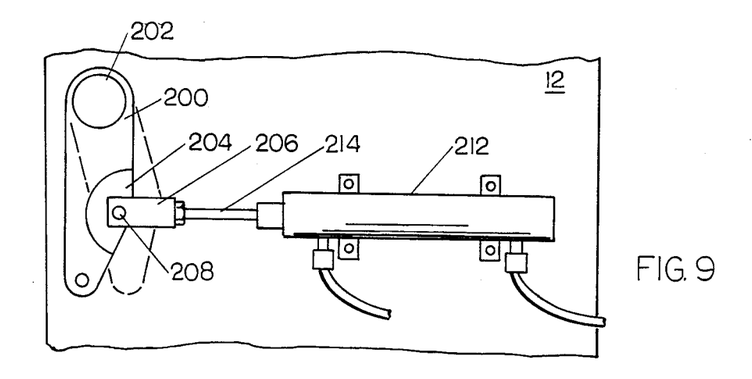
FIG. 9 shows a plan view of a pinch roller swing arm.
Figure 10:
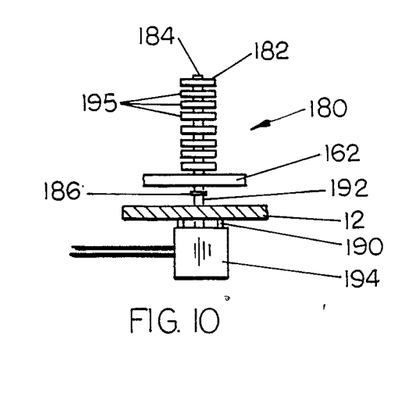
FIG. 10 depicts a cross sectional view of a portion of the drive assembly taken along line 10—10 in FIG. 3.

Referring now to FIGS. 8-10, accumulator drive assembly 180 generally comprises drive roller 182, pinch roller 196 and stepping motor 194. As detailed below, stepping motor 194 actuates drive roller 182 and, through the cooperation of pinch roller 196, stuffs a measured length of leader ribbon 35 into accumulator enclosure 161. Drive roller 182 is mounted adjacent to left stripper 220. Drive roller 182 includes roller shaft 184 which is rotatably supported within an aperture in accumulator base 162. Stepping motor 194, mounted to the underside of base plate 12 by motor stand offs 190, includes motor shaft 192 which is coaxially aligned with and coupled to roller shaft 184 by coupling 186. In the preferred embodiment, stepping motor 194 is Model No. VEXTAPX 244-03AA manufactured by Oriental Motors U.S.A. Corp. The motor shaft 192 rotates 1.8 degrees for each stepping pulse generated by controller 250.

Referring again to FIGS. 8 and 9, there is shown pinch roller swing arm 200 pivotably supported between accumulator base 162 and base plate 12 by shaft 202. Pinch roller swing arm 200 supports fixed pinch roller shaft 198. Rotatably supported on pinch roller shaft 198 is pinch roller 196. Fixed to the upper surface of base plate 12 beneath accumulator base 162 is double acting pneumatic cylinder 212. Extending from cylinder 212, which in the preferred embodiment is Model No. 007-.5 DXP manufactured by Bimba Manufacturing Co., is piston rod 214 which is connected to shoulder portion 204 of pinch roller swing arm 200 by clevis 206 and pin 208. With piston rod 214 extended as shown in FIG. 9, pinch roller 196 is positioned away from drive roller 182 and into the position shown in FIG. 8 so as to allow gripper jaws 104 to pass through gap 225 and into accumulator chamber 175. When pneumatic cylinder 212 is actuated such that piston rod 214 is retracted, pinch roller 196 is drawn toward drive roller 182 such that leader ribbon 35 is engaged between rollers 196 and 182. Upon the subsequent actuation of stepping motor 194 which causes drive roller to rotate in a clockwise direction as viewed in FIGS. 3 and 8, a measured length 20 of leader ribbon 35 will be drawn into interior chamber 175 of accumulator enclosure 161.

As best shown in FIG. 8, strippers 220, 221 include body portions 222 and a plurality of curved fingers 24 extending therefrom. As also shown in FIG. 8, drive and pinch rollers 182, 196 include a plurality of projecting roller surfaces 195 for engaging leader ribbon 35. Roller surfaces 195 are manufactured from or coated with a rubber or elastomeric material so as to engage leader ribbon 35 without damaging the ribbon as it is drawn into accumulator enclosure 161. Rollers 182, 196 and strippers 220, 221 are positioned such that curved fingers 224 are disposed between the projecting roller surfaces 195 of rollers 182 and 196, fingers 224 serving to prevent leader ribbon 35 from being drawn around rollers 182 and 196 rather than being drawn between them and into accumulator enclosure 161 as desired.

Controller 250

FIG. 12 shows a block diagram disclosing the basic organization of the control system for the measured leader length supply system 50. The control system is centered around controller 250 which may comprise, for example, a digital control circuit designed in accordance with principals well known in the art to effect the operation of the controller 250 a described herein. Controller 250 is supported by base plate 12 and, in the preferred embodiment, is housed beneath part bin support structure 28 shown in FIG. 1. Power supply 252 is electrically connected to controller 250 and supplies the power necessary for the control of measured leader length supply apparatus 50.

The control system comprises a plurality of control inputs 260 and a plurality of control outputs 270. Inputs 260 comprise switches and sensors located throughout the measured leader length supply system 50. To the extent that such switches and sensors have been previously described and shown, common reference characters are used herein and reference is made to those figures wherein such switches or sensors are depicted.

As shown in FIG. 12, control inputs 260 include a start switch 262 which signals controller 250 to initiate the operation of supplying measured leader lengths 20. Ribbon detector 176 mounted in accumulator 160 supplies an input to controller 250 indicating the presence or absence of ribbon 35 within accumulator chamber 175. As previously described, Hall effect sensors 108, 110, 112, 114 signal controller 250 that gripper 100 has reached certain desired positions about support plate 52. More specifically, sensor 110 signals controller 250 when gripper 100 is in the down position and sensor 108 signals controller 250 when gripper 100 is in its raised position. Hall effect sensors 112 and 114 signal controller 250 that gripper 100 has reached its forward and back position respectively. Control inputs 260 further include ribbon length switch 264 for selecting the desired length of leader ribbon to be supplied. Preferably, ribbon length switch 264 comprises a thumbwheel rotary switch providing a digital indicator for the length of leader selected. Unit selection switch 266 indicates to controller 250 whether the length selected by ribbon length switch 264 is to be measured in centimeters or inches.

Control outputs 270 include an output to stepping motor 194 for driving stepping motor 194 to rotate the appropriate number of revolutions necessary to stuff the desired length of leader ribbon 35 into accumulator enclosure 161. The remaining control outputs 270 from controller 250 comprise outputs to solenoid valves 272, 274, 276 and to solenoids 278 and 280 which operate a single pneumatic valve (not shown) as described below. Solenoids 278 and 280 are employed to actuate a pneumatic valve that controls horizontal drive 90 of gripper assembly 70, only one of solenoids 278, 280 being actuated at a time. Upon actuation of solenoid 278 by controller 250, gripper 100 is driven to the left as viewed in FIG. 2 by operation of horizontal cylinder 94. Similarly, the actuation of solenoid 280 drives gripper 100 to the right. Solenoid valve 274 is employed to actuate vertical drive 80 of gripper assembly 70. Solenoid valve 276 actuates cylinder 212 and pinch roller swing arm 200. Solenoid valve 272 actuates cutter and clamp assembly 130 as well as gripper 100 such that gripper 100 is closed when cutter and clamp assembly 130 is open, and vice versa. In the preferred embodiment, solenoids 272–280 are housed within control panel 40 shown in FIG. 1, but they may alternatively be situated below or upon base plate 12 in any convenient location.

Operation of Measured Leader Length Supply System 50

Referring to FIGS. 1 and 2, ribbon supply reel 31 is first positioned upon ribbon turn table 32. The leading end of leader ribbon 35 is then manually threaded around ribbon tensioning post 34 and ribbon guide 36 and through ribbon tract 37 into position between gripper jaws 104 of gripper 100. Ribbon length switch 264 is set for the desired length of leader ribbon and unit selection switch 266 is set for the desired units of measure, either centimeters or inches.

Figure 11A:
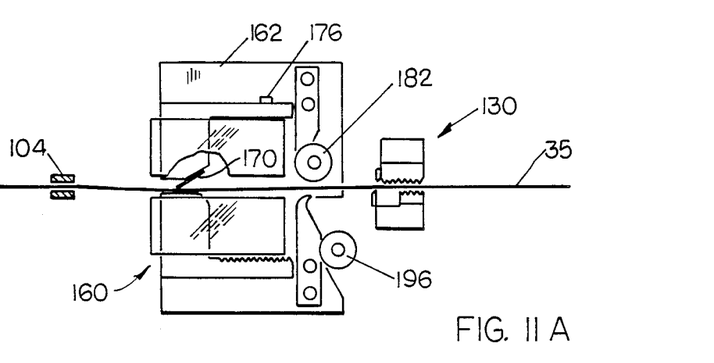
FIGS. 11A and 11B diagrammatically show the accumulator and a portion of the drive assembly shown in FIG. 3 in various stages as ribbon is drawn into the accumulator.
Figure 11B:
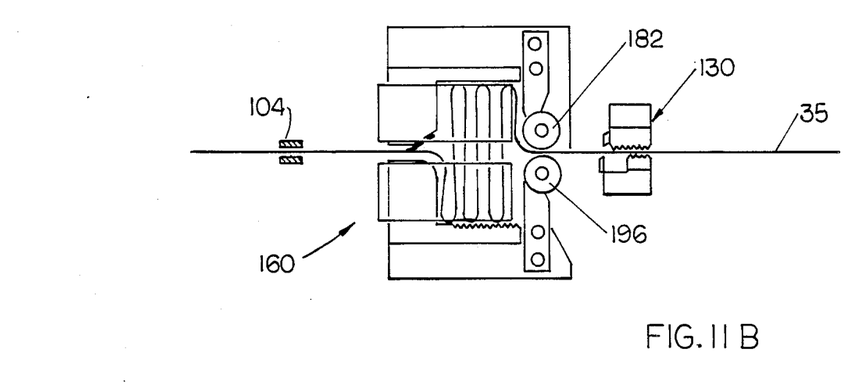

With the power supply 252 turned on to controller 250 and the pneumatic pressure of 60 psi available to the system, start button 262 is depressed. With accumulator 160 empty, ribbon detector 176 will signal controller 250 to initiate the supply cycle. Controller 250 first actuates cutter/gripper solenoid valve 272 causing gripper 100 to close gripper jaws 104 about leader ribbon 35 and, simultaneously, causing pivoting clamping finger 148 and blade 140 to pivot away from fixed clamping finger 150 and fixed blade 146. After gripper jaws 104 have grasped leader ribbon 35 and cutter and clamp assembly 130 has opened, controller 250 will actuate solenoid 278, thereby opening the pneumatic valve controlling horizontal drive 90 of gripper assembly 70. Horizontal cylinder 94 is thus actuated and the leading end of leader ribbon 35 is drawn into and through accumulator 160. When gripper 100 reaches the position shown in FIG. 11A, Hall effect sensor 112 signals controller 250 which actuates solenoid valve 276. The actuation of solenoid valve 276 in turn actuates cylinder 212 to retract piston rod 214 causing pinch and drive rollers 196 and 182 to engage leader ribbon 35. Controller 250 next actuates stepping motor 194 which rotates drive roller 182 clockwise as shown in FIG. 11B a predetermined number of revolutions, thereby stuffing the desired leader length into accumulator enclosure 161. The cutter/gripper solenoid valve 272 is then actuated by controller 250 such that gripper 100 releases the leading end of leader ribbon 35 while cutter and clamp assembly 130 clamps leader ribbon 35 and severs a measured length 20, the ends of measured leader length 20 extending from accumulator enclosure 161.

To recycle gripper 100 to its initial starting position, controller 250 first actuates solenoid valve 274 thereby causing vertical drive 80 of gripper assembly 70 to raise gripper 100. When gripper 100 is raised above accumulator 160, Hall effect sensor 108 signals controller 250. Upon receipt of this control signal, controller 250 responds by actuating solenoid 280 which, in turn, actuates horizontal drive 90 of gripper assembly 70 such that gripper 100 is moved to the right as viewed in FIG. 2. When gripper 100 reaches the position directly above its initial position, Hall effect sensor 114 signals controller 250 which actuates solenoid valve 274 to lower gripper 100. When gripper 100 reaches its lower most position, Hall effect sensor 110 signals controller 250. At this point in the supply cycle, gripper 100 and measured leader length supply system 50 are again positioned as shown in FIG. 2; however, a measured leader length 20 is now retained within accumulator enclosure 161. When the cartridge assembly technician grasps the leading end and removes measured leader length 20 from accumulator 160, ribbon detector 176 signals controller 250 that accumulator 160 is now empty, at which point controller 250 then initiates another supply cycle.

While a preferred embodiment of the invention has been shown and described, modifications thereof can be made by one skilled in the art without departing from the spirit of the invention.

What is claimed is:

1. Apparatus for supplying measured lengths of ribbon, comprising:
   a supply of ribbon;
   means for accumulating a length of said ribbon as it is drawn from said ribbon supply, said accumulating means including a ribbon path therethrough;
   means for drawing a measured length of said ribbon into said accumulating means, said drawing means comprising means for gripping an end of said ribbon and means for transporting said gripping means and the ribbon end into said accumulating means along said ribbon path; and
   means for severing said measured length from said ribbon.

2. The apparatus of claim 1 further comprising means for controlling the operation of said drawing means and said severing means, wherein said drawing means further comprises means separate from said gripping means for engaging said ribbon and stuffing said measured length of said ribbon into said accumulating means.

3. The apparatus of claim 2 further comprising means for detecting when said accumulating means is empty and for signalling said control means to actuate said drawing means.

4. Apparatus for supplying measured lengths of ribbon, comprising:
   a supply of ribbon;
   means for accumulating a length of said ribbon as it is drawn from said ribbon supply, said accumulating means including a ribbon path therethrough;
   means for drawing a measured length of said ribbon into said accumulating means, said drawing means comprising means for gripping an end of said ribbon and positioning said ribbon in said accumulating means along said ribbon path, and a drive assembly disposed about said ribbon path and engaging said ribbon for stuffing said measured length into said accumulating means; and means for severing said measured length from said ribbon.

5. The apparatus of claim 4 wherein said drive assembly comprises:
a drive roller positioned on one side of said ribbon path;
a pinch roller positioned on the opposite side of said ribbon path;
means for pivoting said pinch roller so as to engage said ribbon between said pinch and drive rollers;
a stepping motor coupled to said drive roller for rotating said drive and pinch rollers a predetermined length number of revolutions and stuffing said measured length into said accumulating means.

6. The apparatus of claim 1 wherein said severing means includes means for clamping said ribbon.

7. Apparatus for supplying measured lengths of ribbon, comprising:
a supply of ribbon, said ribbon having a leading end;
a container for retaining a length of said ribbon;
means for gripping the leading end of said ribbon and drawing said leading end into and through said container along a ribbon path;
means for measuring a length of said ribbon and stuffing it into said container;
means for clamping said ribbon; and
means for severing said measured length from said ribbon.

8. The apparatus of claim 7 wherein said measuring and stuffing means comprises a drive assembly disposed about said ribbon path and engaging said ribbon said drive assembly comprising:
a drive roller positioned on one side of said ribbon path;
a pinch roller positioned on the opposite side of said ribbon path;
means for pivoting said pinch roller so as to engage said ribbon between said pinch and drive rollers;
a stepping motor coupled to said drive roller for rotating said drive and pinch rollers a predetermined number of revolutions and stuffing said measured length into said container.

9. The apparatus of claim 7 further comprising control means for controlling the operation of said measuring and stuffing means and said severing means.

10. The apparatus of claim 9 further comprising means for detecting when said container is empty and for signalling said control means to actuate said measuring and stuffing means.

11. The apparatus of claim 7 wherein said clamping means and said severing means are pneumatically actuated.

12. The apparatus of claim 7 wherein said clamping means comprises:
a base having a pivotable shaft disposed therein;
a fixed clamping finger attached to said base;
a pivotable clamping finger fixed to said shaft and opposing said fixed clamping finger; and
means for pivoting said shaft and engaging said ribbon between said clamping fingers.

13. The apparatus of claim 12 wherein said severing means comprises a pair of scissor blades attached to said clamping means.

14. The apparatus of claim 12 wherein said severing means comprises a rotating cutting blade attached to said clamping means.

15. The apparatus of claim 12 wherein said severing means comprises:
a fixed cutting blade attached to said fixed clamping finger; and
a pivotable cutting blade attached to said pivotable shaft opposite said fixed cutting blade such that said measured length is severed by the scissor action of said blades when said shaft is pivoted.

16. Apparatus for severing measured lengths of ribbon from a supply of ribbon:
a support plate;
a supply of ribbon on said support plate, said ribbon having a leading end;
an accumulator on said support plate for retaining a length of said ribbon;
a gripper supported above said support plate for grasping said leading end of ribbon;
means for transporting said gripper in the horizontal and vertical directions and for drawing said leading end of ribbon into and through said accumulator;
a roller assembly on said support plate adjacent said accumulator for stuffing a length of said ribbon into said accumulator;
a stepping motor coupled to said roller assembly for rotating said roller assembly a predetermined number of revolutions so as to stuff a measured length of said ribbon into said accumulator;
means on said base for clamping said ribbon;
means forming a part of said clamping means for severing said measured length from said ribbon when said ribbon is clamped.

17. The apparatus of claim 16 wherein said clamping means comprises:
a base having a pivotable shaft disposed therein;
a fixed clamping finger attached to said base;
a pivotable clamping finger fixed to said shaft and opposing said fixed clamping finger; and
means for pivoting said shaft and engaging said ribbon between said clamping fingers.

18. The apparatus of claim 16 wherein said severing means comprises a pair of scissor blades attached to said clamping means.

19. The apparatus of claim 18 wherein said severing means comprises:
a fixed cutting blade attached to said fixed clamping finger; and
a pivotable cutting blade attached to said pivotable shaft opposite said fixed cutting blade such that said measured length is severed by the scissor action of said blades when said shaft is pivoted.

20. The apparatus of claim 16 wherein said severing means comprises a rotating cutting blade attached to said clamping means.

21. The apparatus of claim 16 further comprising control means for controlling the operation of said apparatus.

22. The apparatus of claim 21 further comprising means for detecting when said accumulator is empty.

23. The apparatus of claim 22 wherein said detecting means comprises an optical sensor.

24. The apparatus of claim 16 further comprising a leader length selection switch for selecting the measured length of said ribbon to be stuffed and severed.

* * * * *